UNITED STATES PATENT OFFICE.

MICHAEL KARDOS, OF CHARLOTTENBURG, AND PAUL NAWIASKY, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

VAT DYE AND PROCESS OF MAKING IT.

1,200,848.     Specification of Letters Patent.     Patented Oct. 10, 1916.

No Drawing.     Application filed September 10, 1914. Serial No. 861,066.

*To all whom it may concern:*

Be it known that we, MICHAEL KARDOS and PAUL NAWIASKY, citizens of the Austrian Empire, residing at Charlottenburg and Ludwigshafen-on-the-Rhine, respectively, Germany, have invented new and useful Improvements in Vat Dyes and Processes of Making Them, of which the following is a specification.

Our invention relates to new vat coloring matters of the naphthalene series. They are characterized by possessing at least one imid group, the hydrogen of which has been substituted by any radical and by consisting when dry of from orange to red to brown powders which are insoluble in water and in dilute acids and alkalis, but are soluble in concentrated sulfuric acid giving from blue-red to violet solutions and are soluble in hydrosulfite solution giving green-blue to cherry-red vats which dye cotton from orange to red-violet shades of excellent fastness.

We can obtain our new coloring matters by subjecting an imid of naphthalene-1.8-dicarboxylic acid, corresponding to the formula

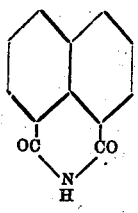

in which the hydrogen of the imid group has been substituted by any radical, or a derivative thereof, to the action of an alkaline melt. As instances of the aforesaid imids in which the hydrogen of the imid group has been substituted by any radical, we mention, for instance, those containing an alkyl, or aryl, group attached to the nitrogen atom instead of hydrogen, and further halogen derivatives of any of these compounds.

We can also obtain coloring matters of our invention by taking a coloring matter obtainable by melting with caustic alkali an imid of naphthalene-1.8-dicarboxylic acid not substituted in the imid group or an oxim of acenaphthenequinone, for instance the mono-oxim corresponding to the formula,

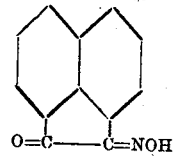

and then treating such a coloring matter so as to replace the imid hydrogen atom, or atoms, by a substituent, or substituents. For instance, we can introduce an alkyl; or aryl, group, or groups, into the imid group, or groups.

Our new coloring matters may also contain halogen and the halogen can be introduced into the coloring matter after its formation or into one or other of the initial materials from which our new coloring matters are to be produced. It should be noted, however, that if a halogenated derivative of an imid of naphthalene-1.8-dicarboxylic acid be melted with alkali, a part or even the whole of the halogen may be eliminated during the formation of the coloring matter according to the conditions under which the melting is carried out.

The following examples will serve to illustrate how some of our new coloring matters can be obtained and how some of the intermediate products can be produced, but the invention is not in any way confined to the examples. The parts are by weight.

Example 1: Heat one hundred parts of a mixture containing equal molecular proportions of potassium hydrate and sodium hydrate to about 170° C. and introduce ten parts of N-methyl naphthalimid (obtainable by heating naphthalene-1.8-dicarboxylic anhydrid with methylamin, or by methylating the corresponding imid). Then raise the melt to from 200° to 230° C. and maintain this temperature until a test portion shows that no more coloring matter is being formed. Then introduce the mass into water and pass air through the solution until the suspension, which was originally red-violet has become yellowish-red. Then filter off the coloring matter, wash it until it is neutral, and then, if necessary, extract it with boiling glacial acetic acid in order to remove any unaltered N-methyl naphthalimid. The coloring matter consists when dry of a brownish-red powder and yields in concentrated sulfuric acid a solution which by transmitted light appears violet and by reflected light scarlet. The coloring matter colors cotton from a red-violet vat violet shades, which upon exposure to the air are converted into pure brick-red shades fast against the action of chlorin and light. In a similar manner a coloring matter possessing analogous properties can be obtained from N-ethyl naphthalimid. N-phenyl naphthalimid can be made to yield a red-violet dye by employing a higher temperature, say 300° to 340° C.

Example 2: Heat together in an oil bath while stirring at from 280° to 300° C., in one part of naphthalene-1.8-dicarboxylic acid imid, five parts of caustic potash and a little water, and maintain this temperature for about fifteen minutes until the formation of the coloring matter is complete. Then dissolve the mass in water, partially neutralize the alkali and pass air through the solution, whereupon the coloring matter is precipitated in the form of a red-violet powder. Filter off, wash well and dry. With alkaline hydrosulfite it yields a dark cherry-red vat which colors cotton dark violet shades. The shades, however, in the air turn to bordeaux of excellent fastness to potting and light. The coloring matter yields a red-violet, slightly fluorescent solution in concentrated sulfuric acid.

In the same way a product which appears to be identical with the coloring matter foregoing described is obtained, by introducing twenty parts of naphthalene-1.8-dicarboxylic acid imid into a mixture of one hundred and twenty parts of caustic potash and thirty-two parts of ethyl-alcohol and boiling the whole while stirring in a reflux apparatus for about one hour, or by introducing one part of the mono-oxim or the dioxim of acenaphthene-quinone, while stirring, into a melt containing five parts of caustic potash and a little water at from 280° to 300° C. and maintaining this temperature until the formation of the coloring matter is complete.

The coloring matter, obtainable according to one of the foregoing proceedings, is brought into a very finely divided state and then for a few hours shaken with small quantities of dimethyl sulfate and caustic soda solution, gradually adding further small quantities of dimethyl sulfate and caustic soda solution, until a test portion of the mixture dyes cotton from a hydrosulfite vat a pure brick-red. The formation of the new coloring matter is then complete. Then filter it off, wash it and grind it to a paste. It appears to be identical with the coloring matter obtainable from N-methyl naphthalimid according to the foregoing Example 1. Instead of dimethyl sulfate, other alkylating agents, such for instance as toluene sulfonic acid methyl ester, can be employed.

Example 3: Mix to a paste ninety parts of nitrobenzene and two parts of finely divided coloring matter obtainable from N-methyl naphthalimid according to the foregoing Example 1. Then add one-fifth of a part of iodin and at the temperature of the boiling water bath pass a slow current of chlorin through the mixture for three hours. On cooling, the greater part of the new compound separates out in the form of brick-red needles, which yield a blue-red solution in concentrated sulfuric acid. It yields a greenish blue vat and dyes cotton a brilliant yellow red.

Example 4: Mix together to a paste ninety parts of nitrobenzene and two parts of the coloring matter obtainable from N-methyl naphthalimid according to the foregoing Example 1. Then add one-fifth of a part of iodin and ten parts of sulfuryl chlorid and heat the whole on the water bath for three hours. On cooling, the greater part of the new compound crystallizes out. It yields a blue-red solution in concentrated sulfuric acid and a greenish-blue vat in alkaline hydrosulfite solution. It dyes cotton somewhat more yellowish shades of red than does the coloring matter of the foregoing Example 3.

Instead of nitrobenzene other solvents or diluents such for instance, as trichlor-benzene, or sulfuric acid can be employed. Further, other halogen carriers, for instance, antimony pentachlorid can be employed, or the use of such carriers may be entirely dispensed with.

Now what we claim is:—

1. The new vat coloring matters of the naphthalene series derived from an imid of naphthalene-1.8-dicarboxylic acid which possess an imid group in which the hydrogen has been substituted by any radical and consist when dry of from orange to red to brown powders, are insoluble in water and in dilute acids and alkalis, are soluble in concentrated sulfuric acid giving blue-red to violet solutions, yield green-blue to cherry-red vats and dye cotton from orange to red-violet.

2. The new vat coloring matters of the naphthalene series derived from an imid of naphthalene-1.8-dicarboxylic acid which possess an imid group in which the hydrogen has been substituted by any radical and also halogen and consist when dry of reddish powders, which are insoluble in water and in dilute acids and alkalis, yield blue-red solutions in concentrated sulfuric acid, give rise to bluish vats and dye cotton from orange to red shades.

3. The new vat coloring matter obtainable by subjecting N-methyl-naphthalimid to the action of an alkaline melt, and then treating the product with a chlorinating agent, which new coloring matter contains at least one —N—CH$_3$ group and chlorin and consists when dry of a red crystalline powder which yields a blue-red solution in concentrated sulfuric acid, a greenish-blue vat in alkaline hydrosulfite and dyes cotton brilliant yellow-red.

4. The process of producing vat coloring matters of the naphthalene series by subjecting an imid of a naphthalene-1.8-dicarboxylic acid in which the hydrogen of the imid group has been substituted by any radical to the action of an alkaline melt.

5. The process of producing vat coloring matters of the naphthalene series by subjecting the N-methyl-imid of naphthalene-1.8-dicarboxylic acid to the action of an alkaline melt.

6. The process of producing vat coloring matter of the naphthalene series by subjecting the N-methyl-imid of naphthalene-1.8-dicarboxylic acid to the action of an alkaline melt and then introducing at least one halogen atom into the product obtained.

7. The process of producing vat coloring matters of the naphthalene series by subjecting the N-methyl-imid of naphthalene-1.8-dicarboxylic acid to the action of an alkaline melt and then introducing at least one chlorin atom into the product obtained.

In testimony whereof we have hereunto set our hands in the presence of two subscribing witnesses.

MICHAEL KARDOS.
PAUL NAWIASKY.

Witnesses to the signature of Michael Kardos:
WOLDEMAR HAUPT,
HENRY HASPER.

Witnesses to the signature of Paul Nawiasky:
J. ALEC. LLOYD,
ANDREW HEER.

Copies of this patent may be obtained for five cents each, by addressing the "Commissioner of Patents, Washington, D. C."